//patents.google.com/patent/US3313698

United States Patent Office 3,313,698
Patented Apr. 11, 1967

3,313,698
20-DI-SUBSTITUTED AMINO-PREGNANES
Daniel Bertin, Montrouge, Lucien Nedelec, Clichy-sous-Bois, and Jacques Perronnet, Paris, France, assignors to Roussel-UCLAF, Paris, France, a corporation of France
No Drawing. Filed Apr. 6, 1965, Ser. No. 446,075
Claims priority, application France, Aug. 27, 1962, 907,856; Nov. 27, 1962, 916,749, Patent 2,374M; May 3, 1963, 933,624; Apr. 14, 1964, 970,856; June 3, 1964, 976,906
22 Claims. (Cl. 167—65)

This application is a continuation-in-part of commonly-assigned United States patent application Ser. No. 297,955, filed July 26, 1963, in the names of Bertin and Nedelec, and now abandoned.

The present invention relates to new amino steroids of the pregnane series, namely 20-di-substituted-amino-pregnanes, as well as the process of preparation of these compounds.

In particular, this invention relates to amino steroids of the formula

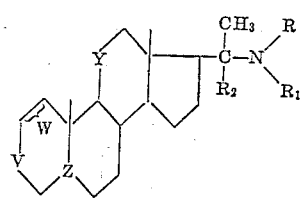

wherein R and $R_1$ are selected from the group consisting of lower alkyl, phenyl and phenyl-lower alkyl, $R_2$ is alkyl having from 1 to 4 carbon atoms, Y is selected from the group consisting of

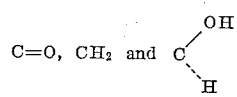

Z is selected from the group consisting of C—H, C with a double bond to the 4 carbon atom and C with a double bond to the 6 carbon atom, W is selected from the group consisting of two hydrogens and a double bond, and V is selected from the group consisting of

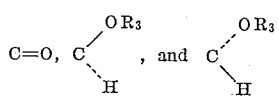

where $R_3$ is selected from the group consisting of hydrogen and the acyl of an organic carboxylic acid having from one to eighteen carbon atoms, in the form of the free base or salts of the same with pharmacologically-compatible acids.

The new amino steroids of the Formula I possess interesting physiological properties. These compounds are endowed with spasmolytic, vasodilatory and coronarodilatory action. In particular, amino steroids of the sub-formula

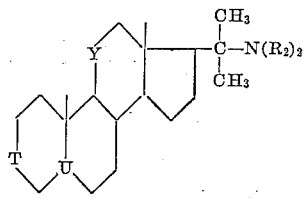

wherein $R_2$ is alkyl having from 1 to 4 carbon atoms, Y is selected from the group consisting of

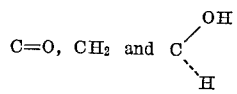

U is selected from the group consisting of C—H, and C with a double bond to the 4 carbon atom, T is selected from the group consisting of

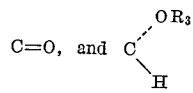

where $R_3$ is selected from the group consisting of hydrogen and the acyl of an organic carboxylic acid having from one to eighteen carbon atoms, with the proviso that when

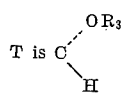

U is C—H, possess particularly a spasmolytic, a vasodilatory and more particularly a coronarodilatory action.

An object of the present invention is the development of an amino steroid of the formula

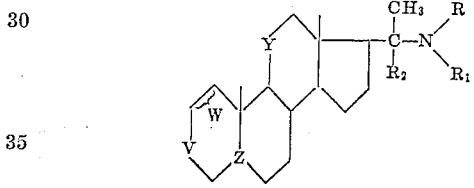

wherein R and $R_1$ are selected from the group consisting of lower alkyl, phenyl and phenyl-lower alkyl, $R_2$ is alkyl having from 1 to 4 carbon atoms, Y is selected from the group consisting of Z is selected from the group consisting of C—H, C with a double bond to the 4 carbon atom and C with a double bond to the 6 carbon atom, W is selected from the group consisting of two hydrogens and a double bond, and V is selected from the group consisting of where $R_3$ is selected from the group consisting of hydrogen and the acyl of an organic carboxylic acid having from one to eighteen carbon atoms, and salts of the same with pharmacologically-compatible acids.

A further object of the present invention is the development of an amino steroid of the formula

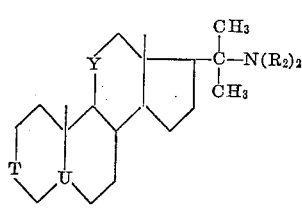

wherein $R_2$ is alkyl having from 1 to 4 carbon atoms, Y is selected from the group consisting of

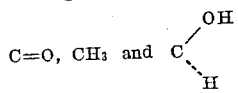

U is selected from the group consisting of C—H, and C with a double bond to the 4 carbon atom, T is selected from the group consisting of

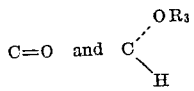

where $R_3$ is selected from the group consisting of hydrogen and the acyl of an organic carboxylic acid having from one to eighteen carbon atoms, with the proviso that when

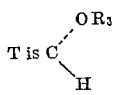

U is C—H, and salts of the same with pharmacologically-compatible acids.

Another object of the invention is the development of a process for the production of amino steroids of the formula

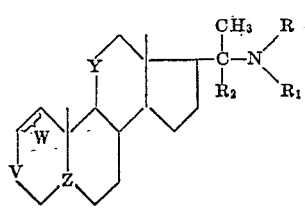

wherein R and $R_1$ are selected from the group consisting of lower alkyl, phenyl and phenyl-lower alkyl, $R_2$ is alkyl having from 1 to 4 carbon atoms, Y is selected from the group consisting of

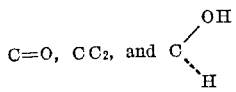

Z is selected from the group consisting of C—H, C with a double bond to the 4 carbon atom and C with a double bond to the 6 carbon atom, W is selected from the group consisting of two hydrogens and a double bond, and V is selected from the group consisting of

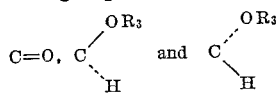

where $R_3$ is selected from the group consisting of hydrogen and the acyl of an organic carboxylic acid having from one to eighteen carbon atoms.

A still further object of the invention is the development of a process for the production of amino steroids of the formula

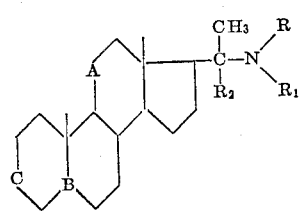

wherein A is selected from the group consisting of $CH_2$ and

B is selected from the group consisting of C—H and C with a double bond to the 6 carbon atom, C is selected from the group consisting of

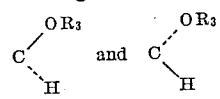

R and $R_1$ are selected from the group consisting of lower alkyl, phenyl and phenyl-lower alkyl, $R_2$ is alkyl having from 1 to 4 carbon atoms, and $R_3$ is selected from the group consisting of hydrogen and the acyl of an organic carboxylic acid having from 1 to 18 carbon atoms, which comprises (a) Reacting a compound of the formula

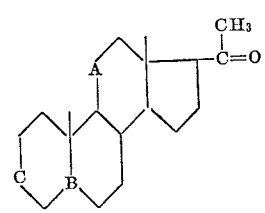

wherein A, B and C have the above-noted meanings, with a primary amine of the formula $$NH_2R$$

where R has the above-noted meaning in the presence of an inert solvent, (b) Reacting an imino steroid of the formula

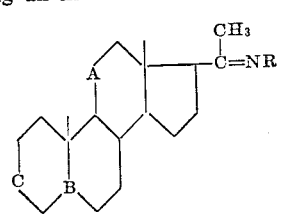

wherein A, B, C and R have the above-noted meanings, with a halide of the formula $$R_1X$$

wherein X is a halide and $R_1$ has the above-noted meaning, in an inert organic solvent at refluxing temperatures, (c) Reacting a ternary iminum compound of the formula

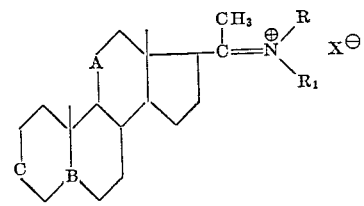

wherein A, B, C, R, $R_1$ and X have the above-noted meanings, with an alkyl magnesium halide of the formula $$R_2MgX$$

wherein $R_2$ and X have the above-noted meanings, in an inert organic solvent at refluxing temperatures, and (d) Recovering said amino steroids.

A yet further object of the invention is the obtention of the novel intermediates (a) An imino steroid of the formula

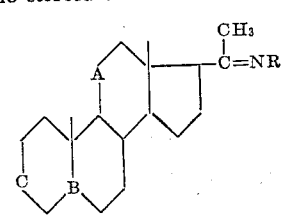

wherein A is selected from the group consisting of $CH_2$ and

B is selected from the group consisting of C—H and C with a double bond to the 6 carbon atom, C is selected from the group consisting of

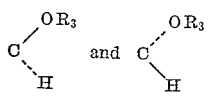

R is selected from the group consisting of lower alkyl, phenyl and phenyl lower alkyl and $R_3$ is selected from the group consisting of hydrogen and the acyl of an organic carboxylic acid having from one to eighteen carbon atoms, (b) A ternary iminium compound of the formula

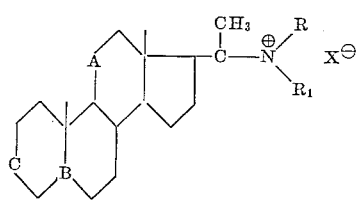

wherein A is selected from the group consisting of $CH_2$ and

B is selected from the group consisting of C—H and C with a double bond to the 6 carbon atom, C is selected from the group consisting of

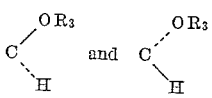

R and $R_1$ are selected from the group consisting of lower alkyl, phenyl and phenyl-lower alkyl, $R_3$ is selected from the group consisting of hydrogen and the acyl of an organic carboxylic acid having from one to eighteen carbon atoms, and X is a halide.

These and other objects of the invention will become more apparent as the description proceeds.

Among the compounds of Formula I, the following are of special interest:

(a) 20 - methyl - 20 - dimethylamino - 5β - pregnane-3α,11β-diol, (b) 20 - methyl - 20 - dimethylamino - 5β - -pregnane-3α-ol-11-one, (c) 20 - methyl - 20 - dimethylamino - Δ⁴ - pregnene-3,11-dione, (d) 20 - methyl - 20 - dimethylamino - 5β - pregnane-3,11-dione, (e) 20 - methyl - 20 - dimethylamino - Δ⁴ - pregnene-3-one, (f) 20 - methyl - 20 - dimethylamino - 5β - pregnane-3α-ol, (g) 20 - methyl - 20 - diethylamino - 5β - pregnane - 3α-ol, (h) 20 - methyl - 20 - N - methyl - N - ethyl - amino-5β-pregnane-3α-ol.

The two interesting representatives of this family of compounds are 20 - methyl - 20 - dimethylamino - 5β - pregnane - 3α - ol and 3α - dimethylamino - acetoxy - 20-methyl - 20 - dimethylamino - 5β - pregnane, which products are endowed with an excellent vasodilatory activity and in particular a coronarodilatory activity and a spasmolytic activity and whose administration even at elevated doses provokes no phenomena of toxicity.

Two other interesting representatives of this family of compounds are 20 - methyl - 20 - diethylamino - 5β - pregnane - 3α-ol and 20 - methyl - 20 - N - methyl - N - ethyl - amino - 5β - pregnane - 3α - ol, which compounds possess an excellent vasodilatory activity and in particular a coronarodilatory as well as a spasmolytic activity, and the administration of these compounds even at increased doses does not cause any phenomenon of toxicity. Moreover, they distinguish themselves by an increased duration of action, in comparison, for example, with the corresponding 20 - methyl - 20 - dimethyl - amino-5β-pregnane-3α-ol.

The useful dosology of these compounds is controlled between 2 and 20 mg. per dose and 2 and 100 mg. per day in the adult as a function of the method of administration and the compound being administered.

The process of preparation of the compounds according to the general Formula I is characterized in that a primary amine of the formula $NH_2R$ is made to react on a 20-oxo-steroid of the pregnane series of which the other existing ketone functions, if any, have been previously protected in the form of a cyclic ketal such as the ethylene ketal. The resultant 20-imino derivative is transformed into a ternary iminium salt by treatment with a lower alkyl, aryl or aralkyl halide of the formula $R_1X$ (X being halogen). The salt obtained is made to react with an alkyl magnesium halide of the formula $R_2MgX$. A 20-alkyl-20-amino-steroid is obtained from which, if desired, the ketone functions are liberated by hydrolysis and/or the functions in the 3- and/or 11-position are transformed by reduction or oxidation, reducing of the double bond in the 5,6-position and/or introducing a double bond in the 4,5-position or a system of two double bonds in the 1,2 and 4,5-positions and/or acylating, if desired, the hydroxyl function in the 3-position and/or also transforming, if desired, the resultant compound into a salt of a mineral or organic acid. This process is shown by the flow diagram of Table I.

TABLE I

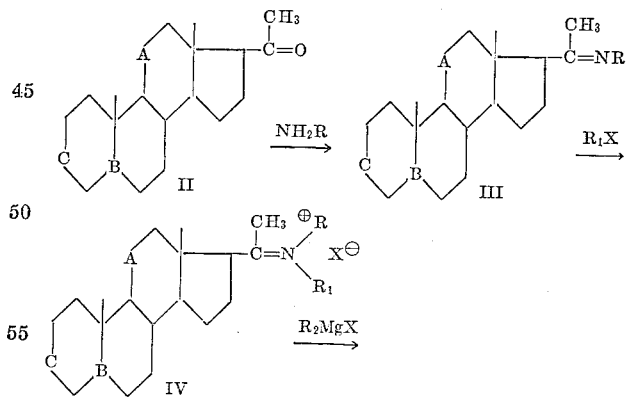

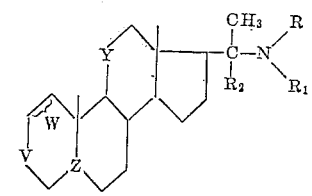

I

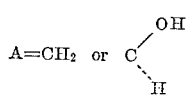

B=C—H or C with a double bond to the 6 carbon atom

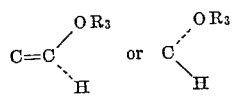

R=lower alkyl, phenyl, or phenyl-lower alkyl
$R_1$=lower alkyl, phenyl, or phenyl-lower alkyl
$R_2$=alkyl having from 1 to 4 carbon atoms
$R_3$=H or acyl of an organic carboxylic acid having from 1 to 18 carbon atoms
X=halide

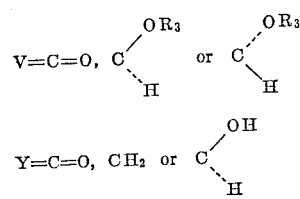

Z=C—H, C with a double bond to the 4 carbon atom, or C with a double bond to the 6 carbon atom
W=2 hydrogens or a double bond In the case of preparation of the products particularly enumerated above, the following procedure is followed:

In order to prepare 20-methyl-20-dimethylamino-5β-pregnane-3α-ol according to the invention, 5β-pregnane-3α-ol-20-one is employed as the starting compound. Methylamine is made to react in the presence of sodium methylate on the starting compound. The resultant 20-methylimino-5β-pregnane-3α-ol is transformed by treatment with methyl iodide into the corresponding iodomethylate. Methyl magnesium bromide is made to react on this latter compound and the desired 20-methyl-20-dimethylamino-5β-pregnane-3α-ol is obtained.

In order to prepare 3α-dimethylaminoacetoxy-20-methyl-20-dimethylamino-5β-pregnane, the hydrochloride of N,N-dimethyl-glycyl chloride is made to react on 20-methyl-20-dimethylamino-5β-pregnane-3α-ol and the desired compound is isolated.

In order to prepare the 20-methyl-20-dimethylamino-5β-pregnane-3α,11β-diol, 3α-acetoxy-5β-pregnane-11β-ol-20-one is employed as the starting product and one operates in an analogous manner to that recited above for the preparation of 20-methyl-20-dimethylamine-5β-pregnane-3α-ol.

In order to prepare 20-methyl-20-dimethylamino-5β-pregnane-3α-ol-11-one, 20-methyl-20-dimethylamino-5β-pregnane-3α,11β-diol, obtained as above, and whose alcohol group in the 3-position has been previously protected in the form, for example, of the acetate which is prepared by the action of acetic acid anhydride in the presence of pyridine, is utilized as the starting compound. The 3α-acetoxy-20-methyl - 20 - dimethylamino-5β-pregnane-11β-ol is subjected to the action of an energetic oxidizing agent such as the mixture of sulfuric and chromic acids. Then the resulting 11-ketonic derivative is saponified by the action of an alkaline base, for example, alcoholic sodium hydroxide and the desired 20-methyl-20-dimethylamino-5β-pregnane-3α-ol-11-one is obtained.

In order to prepare 20-methyl-20-dimethylamino-$\Delta^4$-pregnene-3,11-dione, 20-methyl-20-dimethylamino-5β-pregnane-3α,11β-diol is treated with an energetic oxidizing agent, such as, for example, the mixture of sulfuric and chromic acids. Then the 4,5-double bond is introduced into the 3,11-diketonic derivative obtained by bromination in acetic acid and dehydrobromination by the mixed lithium bromide-lithium carbonate salt in dimethylformamide.

In order to prepare 20-methyl-20-dimethylamino-$\Delta^4$-pregnene-3-one, $\Delta^5$-pregnene-3β-ol-20-one is employed as the starting compound. This product is transformed into 20-methyl-20-dimethylamino - $\Delta^5$ - pregnene-3β-ol in an analogous manner to that of the preparation of 20-methyl-20-dimethylamino-5β-pregnane - 3α - ol described above. Then the aminosteroid obtained is subjected to the action of an oxidizing agent such as aluminum isopropylate in the presence of methylisobutyl-ketone and by double exchange of functions, the desired 20-methyl-20-dimethylamino-$\Delta^4$-pregnene-3-one is obtained.

In order to prepare 20 - methyl-20-dimethylamino-5α-prgenane-3β-ol, 20 - methyl-20-dimethylamino-$\Delta^5$-pregnene-3β-ol obtained above is subjected to reduction by catalytic hydrogenation.

In order to prepare 20-methyl-20-diethylamino-5β-pregnane-3α-ol, 5β-pregnane-3α-ol-20-one is converted into 20-ethylimino-5β-pregnane-3α-ol by the action of the ethylamine. Next, by treatment with ethyl iodide, the iodoethylate of 20-ethylimino-5β-pregnane-3α-ol, is prepared, upon which the methylmagnesium bromide dissolved in tetrahydrofuran is brought to reaction, thus obtaining 20 - methyl-20-diethylamino-5β-pregnane-3α-ol.

In order to prepare 20-methyl-20-N-methyl-N-ethyl-amino-5β-pregnane-3α-ol, the iodoethylate of 20-methyl-imino-5β-pregnane-3α-ol is prepared by treating 20-methylimino-5β-pregnane-3α-ol with ethyl iodide or by treating 20 - ethylimino-5β-pregnane-3α-ol with methyl iodide. Then methylmagnesium bromide dissolved in the tetrahydrofuran is reacted on this quaternary iminium salt, thus obtaining 20 - methyl - 20-N-methyl-N-ethyl-amino-5β-pregnane-3α-ol.

In order to prepare other esters in the 3-position of the final compounds of Formula I, the compound having the free hydroxyl in the 3-position can be reacted with an esterifying derivative, such as the free acid, the acid chloride or the acid anhydride, of an organic carboxylic acid having from 1 to 18 carbon atoms.

Among the organic carboxylic acids having from one to eighteen carbon atoms are alkanoic acids, such as acetic acid, lauric acid, stearic acid, etc.; alkenoic acids such as undecenylic acid, oleic acid, etc.; phenylalkanoic acids such as phenylacetic acid, p-methylphenylacetic acid, etc.; cycloalkanoic acids such as cyclohexanoic acid, tetrahydrophthalic acid, etc.; cycloalkylalkanoic acids such as cyclohexylacetic acid, etc.; phenyl carboxylic acids such as benzoic acid, phthalic acid, etc.; aminoalkanoic acids such as N,N-dimethylamino-acetic acid, etc.

The following examples are given to enable those skilled in the art to better appreciate and practice the invention. It is to be understood, however, that the specific embodiments are not deemed limitative.

EXAMPLE 1

Preparation of 20-methyl-20-dimethylamino-5β-pregnane-3α-ol and the corresponding 3α-dimethylaminoacetylated derivative Step A: Preparation of 20-methylimino-5β-pregnane-3α-ol.—13 gm. of 5β-pregnane-3α-ol-20-one and 3 gm. of sodium methylate were introduced into a solution of 39 cc. of monomethylamine in 70 cc. of methanol. The reaction mixture was cooled to −10° C. 10 cc. of methanol were added. The reaction mixture was heated overnight under pressure to 100° C. while periodically agitating. The entire mixture was next cooled to −10° C. The crystals formed were vacuum filtered, washed successively with methanol and with water and dried. 9.8 gm. of raw 20-methylimino-5β-pregnane-3α-ol were obtained, which product was purified by recrystallization from ethanol. The purified product had a melting point of 220–222° C. and a specific rotation $[\alpha]_D^{20} = +58.5° \pm 1°$ (c.=1% in ethanol).

The product is soluble in chloroform, slightly soluble in alcohols, acetone and benzene and insoluble in water.

Analysis. — $C_{22}H_{37}ON$; molecular weight=331.53. Calculated: C, 79.70%; H, 11.25%; N, 4.22%. Found: C, 79.8%; H, 11.0%; N, 4.5%.

This compound is not described in the literature.

*Step B: Preparation of the iodomethylate of 20-methylimino-5β-pregnane-3α-ol.*—20 gm. of 20-methylimino-5β-pregnane-3α-ol were introduced into 240 cc. of chloroform. About 40 cc. of solvent were distilled therefrom at atmospheric pressure. Then 60 cc. of methyl iodide were added and the reaction mixture was heated to reflux for a period of about 3 hours. Next, the mixture was cooled and iced for a period of 30 minutes. The product formed was vacuum filtered, washed successively with chloroform and with ether and dried. 27 gm. of the raw iodomethylate of 20-methylimino-5β-pregnane-3α-ol were obtained having a melting point of about 305° C. (with decomposition).

The product was slightly soluble in water and ethanol and insoluble in benzene and chloroform.

*Analysis.*—Calculated for iodine: 26.80%. Found: 27.5%.

This compound is not described in the literature.

*Step C: Preparation of 20-methyl-20-dimethyl-amino-5β-pregnane-3α-ol.*—140 cc. of a 2.55 M solution of methylmagnesium bromide in ether were introduced into 180 cc. of tetrahydrofuran. Then slowly 11.8 gm. of the iodomethylate of 20-methylimino-5β-pregnane-3α-ol were added. The reaction mixture was heated to reflux overnight. Then slowly under agitation it was poured into the following mixture:

Water and ice _____ cc __ 1,000
Concentrated ammonium hydroxide solution _ cc __ 150
Ammonium chloride _____ gm __ 100

The reaction mixture was next extracted with a 1:1 mixture of benzene and ether. The extracts were combined, washed successively with a mixture of ammonium chloride-ammonium hydroxide solution, with water and with saturated salt solution, dried over magnesium sulfate, then evaporated to dryness. The residue was taken up with hot ethanol. 20 cc. of acetic acid and a solution of 12.5 gm. of sodium acetate in 20 cc. of water were added. The entire mixture was heated to 80° C. under nitrogen for a period of 15 minutes and then 50 cc. of sodium hydroxide solution were added. Next, the reaction mixture was poured into a mixture of water and ice. The precipitate formed was extracted with ether. The ethereal extract was washed with water, dried and evaporated to dryness. The residue was dissolved in ether. A stream of gaseous hydrochloric acid was made to pass into the solution until the solution became acid. The precipitate was vacuum filtered and dried. 8.25 gm. of the raw hydrochloride of 20-methyl-20-dimethylamino-5β-pregnane-3α-ol were obtained, melting at about 290° C.

The hydrochloride salt obtained above was dissolved in aqueous ethanol. Then slowly under agitation a normal solution of sodium hydroxide was added. Then a mixture of water and ice was added. The precipitate formed was vacuum filtered, washed with water and dried. 20-methyl-20-dimethylamino-5β-pregnane-3α-ol was obtained. For analysis, the product obtained was purified by passing through the corresponding oxalate.

For this, 5.49 gm. of the above 20-methyl-20-dimethylamino-5β-pregnane-3α-ol was dissolved in 55 cc. of ethanol. Then under agitation a hot solution of 3.3 gm. of oxalic acid in 28 cc. of ethanol was added. The reaction mixture was allowed to stand for a period of 10 minutes at room temperature, then iced for a period of 30 minutes. The crystalline precipitate formed was vacuum filtered, washed with ethanol and ether and dried. 5.87 gm. of the oxalate of 20-methyl-20-dimethylamino-5β-pregnane-3-ol were obtained, melting at 255–256° C.

This compound is soluble in alcoholic water, slightly soluble in alcohols, and insoluble in ether, acetone and benzene.

In order to obtain the free base, 5.87 gm. of the oxalate described above was dissolved in 50 cc. of aqueous ethanol. 6 cc. of potassium hydroxide solution were added. The reaction mixture was diluted by the addition of water. Thereafter it was extracted with ether. The ethereal extracts were washed with water, dried over magnesium sulfate and distilled to dryness. 5.4 gm. of 20-methyl-20-dimethylamino-5β-pregnane - 3α-ol were obtained, melting at about 154° C. and having a specific rotation $[\alpha]_D^{20} = +21° \pm 1.5°$ (c.=0.7% in ethanol).

The product is soluble in alcohols and chloroform, moderately soluble in ether and insoluble in water.

*Analysis.*—$C_{24}H_{43}ON$; molecular weight=361.59. Calculated: C, 79.72%; H, 11.98%; N, 3.87%. Found: C, 80.0%; H, 12.0%; N, 4.2%.

This compound is not described in the literature.

*Preparation of 3α-dimethylaminoacetoxy-20-methyl-20-dimethylamino-5β-pregnane*

1.444 gm. of 20-methyl-20-dimethylamino-5β-pregnane-3α-ol were dissolved in 28 cc. of chloroform under a stream of nitrogen and the solution was cooled in an ice bath. Then under agitation 3.160 gm. of the hydrochloride of N,N-dimethylglycyl chloride were added. The reaction mixture was heated to reflux for a period of one hour and thirty minutes while maintaining the bubbling of nitrogen therethrough. The solution obtained was cooled, then poured into 150 cc. of a saturated solution of sodium bicarbonate. The organic phase was separated and the aqueous solution was extracted with chloroform. The chloroformic extract was combined with the organic phase. The organic solution was washed with saturated salt solution, dried and concentrated. 2.3 gm. of an amorphous product was obtained which was dissolved in ether and filtered. The filtrate was evaporated to dryness. 1.7 gm. of crystallized 3α-dimethylaminoacetoxy-20-methyl-20-dimethylamino-5β-pregnane were thus recovered. The product was purified by solution in 15 cc. of N hydrochloric acid. The solution was washed with ether and alkalinized. The precipitate was extracted with ether. The ethereal solution was washed, dried and concentrated. 1.5 gm. of 3α-dimethylaminoacetoxy-20-methyl-20-dimethylamino-5β-pregnane were thus obtained in the form of a solid colorless product. This product was soluble in dilute aqueous acids, ether and chloroform, very slightly soluble in water and melted at about 104° C. The specific rotation was $[\alpha]_D^{20} = +40.5° \pm 1°$ (c.=1% in ethanol).

*Analysis.*—$C_{28}H_{50}O_2N_2$; molecular weight=446.70. Calculated: N, 6.27%. Found: N, 6.2%.

This compound is not described in the literature.

This compound could easily be transformed into the corresponding dihydrochloride.

1.26 gm. of the free amine, 3α-dimethylaminoacetoxy-20-methyl-20-dimethylamino-5β-pregnane, were taken up in 15 cc. of a 0.6 N solution of dry hydrochloric acid in isopropanol. The isopropanol was then removed while adding benzene to the solution. The supernatant benzenic mother liquor was separated. The resinous residue was dissolved in methanol. The solution was concentrated. The crystals formed were vacuum filtered and dried. 1.4 gm. of the raw dihydrochloride of 3α-dimethylaminoacetoxy-20-methyl-20-dimethylamino-5β - pregnane were obtained. The product was dissolved in methanol. The solution was concentrated while adding thereto ethyl acetate until crystallization occurred. The crystals were separated by vacuum filtration and dried. The purified crystals melted at about 260° C. and had a specific rotation $[\alpha]_D^{20} = +31.5° \pm 1.5°$ (c.=1% in ethanol).

This product was soluble in ether, dilute aqueous acids, alcohols and chloroform, slightly soluble in acetone and insoluble in ether and benzene.

*Analysis.*—$C_{28}H_{52}O_2N_2Cl_2$; molecular weight=519.63. Calculated: C, 64.74%; H, 10.08%; N, 5.39%; Cl, 13.65%. Found: C, 64.9%; H, 10.0%; N, 5.2%; Cl, 13.5%.

This compound is not described in the literature.

EXAMPLE 2

Preparation of 20-methyl-20-dimethylamino-5β-pregnane-3α,11β-diol

*Step A: Preparation of 20-methylimino-5-pregnane-3α,11β-diol.*—A solution of 250 cc. of monomethylamine in 300 cc. of methanol was cooled to 0° C. 43 gm. of 3α-acetoxy-5β-pregnane-11β-ol-20-one and 20 gm. of sodium methylate were added. The reaction mixture was agitated overnight at 120° C. Then the reaction mixture was cooled to 0° C. The precipitate was vacuum filtered, washed with iced methanol and then with water and dried under vacuum. 12.51 gm. of 20-methylimino-5β-pregnane-3α-11β-diol were thus obtained. The concentrated methanolic motor liquors furnished another 11.97 gm., being an overall total of 24.48 gm. of 20-methylimino-5β-pregnane-3α,11β-diol, melting at 234° C. and having a specific rotation $[\alpha]_D^{20} = +79.1° \pm 1°$ (c.=1% in chloroform), for a yield of 62%.

The mother liquor of the second yield diluted with water gave 13 gm. of 5β-pregnane-3α,11β-diol-20 - one (melting point 209–210° C.).

20-methylimino-5β-pregnane-3α,11β - diol occurred in the form of colorless crystals and was slightly soluble in alcohol and ether, soluble in chloroform and insoluble in water.

*Analysis.*—$C_{22}H_{37}O_2N$; molecular weight=347.53. Calculated: N, 4.03%. Found: N, 4.4%.

The product is not described in the literature.

*Step B: Preparation of iodomethylate of 20-methylimino-5β-pregnane-3α,11β-diol.*—23.39 gm. of 20-methylimino-5β-pregnane-3α,11β-diol were introduced into 300 cc. of chloroform. 30 cc. of solvent were distilled therefrom. Then 70 cc. of methyl iodide were added and the reaction mixture was heated to reflux under an atmosphere of nitrogen for a period of two hours and thirty minutes.

The reaction mixture was iced. The precipitate was vacuum filtered, washed with chloroform and ether and dried in the oven at 80° C. 31.25 gm. of the iodomethylate of 20-methylimino-5β-pregnane-3α,11β-diol were obtained having a melting point of more than 300° C. Yield: 95%.

The product is slightly soluble in water and alcohol and insoluble in ether, acetone, benzene and chloroform.

*Analysis.*—$C_{23}H_{40}O_2NI$; molecular weight=489.47. Calculated: I, 25.93%; N, 2.86%. Found: I, 25.2%; N, 2.6%.

The product is not described in the literature.

*Step C: Preparation of 20 - methyl-20-dimethylamino-5β-pregnane-3α,11β-diol.*—330 cc. of a 3.42 M solution of methyl magnesium bromide in ether were introduced into 470 cc. of tetrahydrofuran. Slowly 31.25 gm. of the iodomethylate of 20-methylimino-5β-pregnane - 3α,11β-diol, obtained in the preceding step, were added. The reaction mixture was heated to reflux for a period of 16 hours under an atmosphere of nitrogen and then poured into a mixture of 3,000 cc. of water, 300 gm. of ammonium chloride and 450 cc. of concentrated ammonium hydroxide.

The reaction mixture was agitated for a period of 30 to 40 minutes and extracted with a mixture of benzene and ether (1:1). The extracts were washed with water, dried over magnesiumسulfate and evaporated to dryness under vacuum. The product obtained was dissolved in 500 cc. of ether and a current of gaseous hydrochloric acid was passed into the solution until an acid reaction was obtained. The solution was agitated for 30 minutes, vacuum filtered and 250 cc. of aqueous ethanol, then 500 cc. of water were added and the mixture was allowed to stand for a period of an hour at room temperature under an atmosphere of nitrogen.

The aqueous solution was washed with sulfuric ether and with petroleum ether and 40 cc. of a sodium hydroxide solution were added. The precipitate formed was vacuum filtered. The aqueous solution was extracted with a 1:1 mixture of benzene and ether. The extract was evaporated to dryness and the residue was combined with the above precipitate.

19.18 gm. of raw 20-methyl-20-dimethylamino-5β-pregnane-3α,11β-diol was obtained which could be utilized as such for the following steps.

The product, purified by recrystallization from isopropyl ether, presents the following constants:

Melting point: about 150° C.
Specific rotation: $[\alpha]_D^{20} = +39.5° \pm 1°$ (c.=1% in ethanol).

The product occurred in the form of colorless crystals, soluble in alcohol, ether, acetone, benzene and chloroform.

*Analysis.*—$C_{24}H_{43}O_2N$; molecular weight=377.59. Calculated: C, 76.34%; H, 11.47%; N, 3.71%. Found: C, 76.5%; H, 11.3%; N, 3.9%.

The product is not described in the literature.

The hydrochloride salt of the product was obtained by treating a solution of the product in ethyl acetate with a 1.45 N solution of hydrochloric acid in ether. The hydrochloride salt had a melting point of about 300° C.

EXAMPLE 3

Preparation of 20-methyl-20-dimethylamino-5β-pregnane-3α-ol-11-one

The following mixture was maintained for a period of three hours at room temperature and under an atmosphere of nitrogen:

Raw 20-methyl - 20 - dimethylamino-5β-pregnane-3α, 11β-diol, obtained according to Example 2 __gm__ 1.9
Pyridine _____cc__ 7.6
Acetic acid anhydride _____cc__ 3.8

The mixture was then poured into 70 cc. of water and ice, agitated for 30 minutes and 20 cc. of triethylamine were added thereto. The reaction mixture was extracted by a mixture of benzene and ether (1:1). The extracts were washed with water and with sodium bicarbonate solution, dried over magnesium sulfate and evaporated to dryness under vacuum.

The product obtained, being 2.24 gm. of raw 3α-acetoxy - 20 - methyl - 20 - dimethylamino - 5β - pregnane-11β-ol was dissolved in 43 cc. of acetic acid and slowly 1.8 cc. of the following solution were added:

Chromic acid anhydride _____gm__ 135.0
Concentrated sulfuric acid _____cc__ 115
Water, q.s.p. _____cc__ 500

The reaction mixture was agitated for several minutes. 2 cc. of methanol, then 60 cc. of water were added and the solutionn was alkalinized by the addition of 100 cc. of concentrated ammonium hydroxide. The reaction mixture was extracted with a mixture of benzene and ether (1:1). The extracts were washed with water, dried over magnesium sulfate, and evaporated to dryness under vacuum. 2.2 gm. of raw 3α-acetoxy-20-methyl-20-dimethylamino-5β-pregnane-11-one were obtained.

The product was heated to reflux for a period of 20 minutes in 20 cc. of methanol and 4 cc. of 5 N sodium hydroxide solution. The mixture was cooled and 100 cc. of water were added thereto. The mixture was extracted with a mixture of benzene and ether (1:1). The extracts were washed with water, dried over magnesium sulfate and evaporated to dryness under vacuum. 1.86 gm. of raw 20 - methyl-20-dimethylamino-5β-pregnane-3α-ol-11-one were obtained. The product was dissolved in 50 cc. of ethyl acetate. A current of gaseous hydrochloric acid was passed therethrough until an acid reaction was had in order to obtain the hydrochloride salt which was separated and crystallized from 12 cc. of isopropanol.

1.35 gm. of the hydrochloride salt were obtained having a melting point of 290–300° C., in the form of crystals soluble in water.

The free base was regenerated by dissolving the hydrochloride salt in 10 cc. of ethanol, 3 cc. of water and 6.5 cc. of 5 N sodium hydroxide solution. The precipitate formed was extracted with a mixture of benzene and ether (1:1), and crystallized from ethyl acetate. 0.624 gm. of 20 - methyl - 20 - dimethylamino - 5β - pregnane - 3α - ol-11-one were obtained having a melting point of 173–175° C. and a specific rotation $[\alpha]_D^{20} = +42.5°$ (c.=0.8% in ethanol). Overall yield: 32%.

The product occurred in the form of colorless crystals, slightly soluble in ether, and soluble in alcohol, acetone, benzene and chloroform.

*Analysis.*—$C_{24}H_{41}O_2N$; molecular weight=375.57. Calculated: C, 76.74%; H, 11.00%; N, 3.74%. Found: C, 76.8%; H, 10.8%; N, 3.9%.

The product is not described in the literature.

EXAMPLE 4

*Preparation of 20-methyl-20-dimethylamino-$\Delta^4$-pregnene-3,11-dione*

Step A: *Preparation of 20-methyl-20-dimethylamino-5β-pregnane-3,11-dione.*—14.6 gm. of raw 20-methyl-20-dimethylamino-5β-pregnane-3α,11β-diol obtained according to Example 2 were dissolved in 220 cc. of acetic acid. 26.5 cc. of the following solution:

Chromic acid anhydride _____gm__ 135
Concentrated sulfuric acid _____cc__ 115
Water, q.s.p. _____cc__ 500 were added under agitation and while maintaining the temperature at 20° C.

The reaction mixture was agitated for 30 minutes. 15 cc. of methanol and 250 cc. of water were added. The reaction mixture was cooled and neutralized with 880 cc. of concentrated ammonium hydroxide. The mixture was iced for a period of one hour. The precipitate was vacuum filtered, washed with water, and dried under vacuum.

The product obtained was dissolved in hot ethyl acetate. The solution was concentrated, iced for a period of one hour. The crystals formed were vacuum filtered and washed with ethyl acetate.

8.33 gm. of 20-methyl-20-dimethylamino-5β-pregnane-3,11-dione were obtained having a melting point of 216° C. and a specific rotation $[\alpha]_D^{20} = +54.5° \pm 2°$ (c.=0.45% in ethanol), being a yield of 57.7%.

The product occurred in the form of colorless crystals and was soluble in alcohol, acetone and chloroform and insoluble in water.

*Analysis.*—$C_{24}H_{39}O_2N$; molecular weight=373.56. Calculated: C, 77.17%; H, 10.52%; N, 3.75%. Found: C, 77.2%; H, 10.3%; N, 4.0%.

The product is not described in the literature.

*Step B: Preparation of 20-methyl-20-dimethylamino-$\Delta^4$-pregnene-3,11-dione.*—The following mixture:

20-methyl-20-dimethylamino - 5β - pregnane - 3,11-dione obtained according to the preceding step _____gm__ 4.85
Acetic acid _____cc__ 30
3.1 N aqeuous solution of hydrobromic acid __cc__ 4.3 was heated to 45° C. 18 cc. of a solution of 6.18 gm. of bromine in 50 cc. of acetic acid were added. The reaction mixture was cooled and diluted with 200 cc. of ethyl acetate. The mixture was iced for a period of one hour. The solution was vacuum filtered. The filtrate was washed with ethyl acetate and evaporated to dryness under vacuum. 5.56 gm. of a raw 4ξ-brominated product were obtained which were introduced into the following mixture heated to 110° C.:

Dimethylformamide _____cc__ 55.0
Lithium carbonate _____gm__ 5.5
Lithium bromide _____gm__ 2.75

The reaction mixture was maintained under agitation and under an atmosphere of nitrogen for a period of four hours and thirty minutes. Then the mixture was cooled and poured into a mixture of water and ice. The mixture was agitated for a period of one to two hours. The product was vacuum filtered, washed with water and dried. The product was crystallized from ethyl acetate and 1.522 gm. of 20-methyl-20-dimethylamino-$\Delta^4$-pregnene - 3,11-dione were obtained having a melting point of 232–234° C. and a specific rotation $[a]_D^{20} = +158° \pm 5°$ (c.=0.2% in ethanol). Yield starting from the bromo compound: 40%.

The product occurred in the form of white crystals, slightly soluble in ether and ethanol and soluble in acids and chloroform.

*Analysis.*—$C_{24}H_{37}O_2N$; molecular weight=371.54. Calculated: C, 77.59%; H, 10.04%; N, 3.76%. Found: C, 77.6%; H, 9.7%; N, 3.9%.

The product is not described in the literature.

EXAMPLE 5

*Preparation of 20-methyl-20-dimethylamino-$\Delta^4$-pregnene-3-one*

Step A: *Preparation of 20-methylimino-$\Delta^5$-pregnene-3β-ol.*—A solution of 200 cc. of monomethylamine in 240 cc. of methanol was cooled to —10° C. 50 gm. of $\Delta^5$-pregnene-3β-ol-20-one and 12 cc. of sodium methylate were introduced. 10 cc. of methanol were added and the reaction mixture was heated under pressure to 100° C. overnight while agitating.

The mixture was cooled to —10° C. The crystals formed were vacuum filtered, washed with iced methanol, with aqueous methanol and with water and dried. After recrystallization from methanol, 23 gm. of 20-methylimino-$\Delta^5$-pregnene-3β-ol were obtained having a melting point of 230° C. and a specific rotation $$[a]_D^{20} = -17.5° \pm 2°$$

(c.=0.5% in tetrahydrofuran). Yield: 44.2%.

The product occurred in the form of colorless crystals, slightly soluble in alcohol, acetone, and chloroform and insoluble in water, dilute acids and alkalis, ether and benzene.

*Analysis.*—$C_{22}H_{35}NO$; molecular weight=329.52. Calculated: C, 80.19%; H, 10.71%; N, 4.25%. Found: C, 80.1%; H, 10.4%; N, 4.2%.

This product is not described in the literature.

*Step B: Preparation of the iodomethylate of 20-methylimino-$\Delta^5$-pregnene-3β-ol.*—23 gm. of 20-methylimino-$\Delta^5$-pregnene-3β-ol were introduced into 400 cc. of chloroform. 40 cc. of the solvent were distilled therefrom. 80 cc. of methyl iodide were added and the reaction mixture was heated to reflux for a period of two hours. Next, the reaction mixture was iced, washed with chloroform and ether and dried. 29.8 gm. of the raw iodomethylate of 20-methylimino-$\Delta^5$-pregnene-3β-ol were thus obtained which could be utilized as such for the following step. The product had a melting point of 280° C. with decomposition. Yield: 90.5%.

The product occurred in the form of white crystals, slightly soluble in alcohol and benzene, and insoluble in water, dilute acids and alkalis, ether, acetone and chloroform.

*Analysis.*—$C_{23}H_{38}INO$; molecular weight=471.47. Calculated: C, 58.59%; H, 8.0%; I, 26.92%; N, 2.97%. Found: C, 58.3%; H, 8.0%; I, 27.0%; N, 2.6%.

The product is not described in the literature.

*Step C: Preparation of 20-methyl-20-dimethyl-amino-$\Delta^5$-pregnene-3β-ol.*—280 cc. of a 3.2 M solution of methyl magnesium bromide in ether were introduced into 400 cc. of tetrahydrofuran. Slowly 28.8 gm. of the iodomethylate of 20-methylimino-$\Delta^5$-pregnene-3β-ol, as obtained above, were added. The reaction mixture was heated to reflux in an atmosphere of nitrogen overnight and then poured into a mixture of 2400 cc. of water and ice, 240 gm. of ammonium chloride and 320 cc. of concentrated ammonium hydroxide.

The product obtained was filtered and washed with water, 25 cc. of methanol, then 52 cc. of acetic acid and 52 gm. of sodium acetate dissolved in 60 cc. of water were added to the washed product. The reaction mixture was heated for a period of one hour at 80° C. Sodium hydroxide solution was added until a pH of 10 was reached. The mixture was poured into 2400 cc. of water and ice over a period of one hour. The precipitate formed was washed with water and extracted with ether. The ethereal extract was dried over magnesium sulfate, treated with animal carbon black, filtered and saturated with gaseous hydrochloric acid.

15.813 gm. of the raw hydrochloride of 20-methyl-20-dimethylamino-$\Delta^5$-pregnene-3$\beta$-ol were obtained having a melting point of 245–250° C. The product was dissolved in 180 cc. of methanol and a solution of sodium hydroxide was added until a pH of 8–9 was reached. 400 cc. of methanol were added to the solution mixture. The mixture was concentrated and iced. The precipitate formed was vacuum filtered, washed and dried in an oven. 12.685 gm. of 20-methyl-20-dimethylamino-$\Delta^5$-pregnene-3$\beta$-ol were recovered having a melting point of 170° C. and a specific rotation $[\alpha]_D^{20} = -65 \pm 1°$ (c.=1% in tetrahydrofuran). Yield: 57.5%.

The product occurred in the form of colorless crystals, slightly soluble in dilute acids, ether, benzene and chloroform, and insoluble in water, dilute alkalis and acetone.

Analysis.—$C_{24}H_{41}NO$; molecular weight=359.58. Calculated: C, 80.15%; H, 11.49%; N, 3.9%. Found: C, 80.4%; H, 11.2%; N, 4.3%.

The product is not described in the literature.

Step D: Preparation of 20-methyl-20-dimethylamino-$\Delta^4$-pregnene-3-one.—A mixture of 5 gm. of 20-methyl-20-dimethylamino-$\Delta^5$-pregnene-3$\beta$-ol, 50 cc. of methyl isobutyl ketone, and 2 gm. of aluminum isopropylate was heated to reflux. To the refluxing mixture, 100 cc. of methylisobutyl ketone were slowly introduced. 85 cc. of the solvent was distilled therefrom and 25 cc. of water were added. The methylisobutyl ketone was removed by distillation. The aqueous solution was extracted with methylene chloride. The extracts were treated with animal carbon black, filtered, washed and evaporated to dryness under vacuum. After crystallization from methanol, 2.46 gm. of 20-methyl-20-dimethylamino-$\Delta^4$-pregnene-3-one were obtained having a melting point of 209–210 C. and a specific rotation $[\alpha]_D^{20} = +57° \pm 1°$ (c.=1% in tetrahydrofuran). Yield: 49.2%.

The product occurred in the form of crystals, soluble in chloroform, slightly soluble in dilute acids, alcohol and ether and insoluble in water and dilute alkalis.

Analysis.—$C_{24}H_{39}NO$; molecular weight=357.56. Calculated: C, 80.61%; H, 10.99%; N, 3.92%. Found: C, 80.7%; H, 10.7%; N, 3.9%.

The product is not described in the literature.

EXAMPLE 6

Preparation of 20-methyl-20-dimethylamino-5$\alpha$-pregnane-3$\beta$-ol

The following mixture:

20-methyl-20-dimethylamino-$\Delta^5$-pregnene-3$\beta$ - ol (obtained according to Example 5) --------gm-- 2
Acetic acid -----------------------------------cc-- 70 was subjected to hydrogenation in the presence of 400 mg. of platinum dioxide in 12 cc. of acetic acid.

At the end of an hour, the passage of hydrogen was stopped. The reaction mixture was filtered. The catalyst was washed with acetic acid and the filtrate and wash liquors were combined and evaporated to dryness.

120 cc. of methanol and 10 cc. of concentrated sodium hydroxide solution were added to the residue, and the mixture was allowed to stand under agitation and under an atmosphere of nitrogen for a period of two hours. The reaction mixture was vacuum filtered. The precipitate was washed with water and dried. The residue was dissolved in methanol. The solution was treated with animal carbon black, filtered, concentrated and iced. The precipitate was vacuum filtered, washed with methanol and dried. 1.812 gm. of 20-methyl-20-dimethylamino-5$\alpha$-pregnane-3$\beta$-ol were obtained having a melting point of 175° C. and a specific rotation of $[\alpha]_D^{20} = +3° \pm 1.5°$ (c.=1% in tetrahydrofuran). Yield: 90%.

The product occurred in the form of colorless crystals and was slightly soluble in dilute acids, alcohols, ether and acetone and insoluble in water and dilute alkalis.

Analysis.—$C_{24}H_{43}NO$; molecular weight=361.58. Calculated: C, 79.71%; H, 11.99%; N, 3.87%. Found: C, 80.0%; H, 12.0%; N, 3.8%.

The product is not described in the literature.

EXAMPLE 7

Preparation of 20-methyl-20-diethylamino-5 - pregnane-3$\alpha$-ol

Step A: 20-ethylimino - 5$\beta$ - pregnane-3$\alpha$-ol.—2 gm. of 5$\beta$-pregnane-3$\alpha$-ol-20-one were introduced into 10 cc. of an ethylamine/methanol mixture (3:5), the resultant suspension was then agitated at room temperature over a period of about 15 hours.

The precipitate thus formed was vacuum filtered, dried, and 1.544 gm. of 20-ethylimino-5$\beta$-pregnane-3$\alpha$-ol were obtained, having a melting point of 146° C., after recrystallization from cyclohexane.

The compound occurred in the form of colorless crystals, slightly soluble in alcohol and cyclohexane, and soluble in chloroform.

Analysis.—$C_{23}H_{39}ON$; molecular weight=345.55. Calculated: C, 79.95%; H, 11.37%; N, 4.05%. Found: C, 80%; H, 11.3%; N, 3.8%.

This compound is not described in the literature.

Step B: The iodoethylate of 20-ethylimino-5$\beta$-pregnane-3$\alpha$-ol.—67 gm. of 20-ethylimino-5$\beta$-pregnane-3$\alpha$-ol were introduced into 1,340 cc. of benzene, 670 cc. of anhydrous ethyl iodide were added thereto and the reaction mixture was heated at reflux for a period of 16 hours. Next, the mixture was reduced to half its volume and cooled. The precipitate which formed was vacuum filtered, washed with benzene and dried.

This crystalline product was triturated with hot ethyl iodide and after the product was vacuum filtered, 43.67 gm. of the iodoethylate of 20-ethylimino-5$\beta$-pregnane-3$\alpha$-ol were obtained, having a melting point of 220–230° C. (decomposition).

The compound was very slightly soluble in ether, and slightly soluble in benzene and chloroform.

Analysis.—$C_{25}H_{44}ONI$; molecular weight=501.52. Calculated: N, 2.79%; I, 25.30%. Found: N, 2.8%; I, 27.1%.

This compound is not described in the literature.

Step C: 20-methyl - 20 - diethylamino-5$\beta$-pregnane-3$\alpha$-ol.—A volume of 900 cc. of a 1.75 N solution of methylmagnesium bromide in ether was heated under agitation in a manner so as to expel the ether completely; while simultaneously tetrahydrofuran was slowly added until the temperature of distillation corresponded with that of tetrahydrofuran. The volume was adjusted to 1,000 cc. by addition of tetrahydrofuran and, in small fractions, always while maintaining the reflux and the agitation, 43.67 gm. of the iodoethylate of 20-ethylimino-5$\beta$-pregnane-3$\alpha$-ol were added. Following this addition, the heating of the reaction mixture was continued for about 15 hours under the same conditions.

The mixture was cooled, poured under agitation into an acetic acid/ice water mixture, alkalized with aqueous ammonia and decanted. The aqueous phase was re-extracted with benzene and the combined organic phases were dried, filtered and evaporated to dryness. A resin was thus obtained, which was dissolved in 250 cc. of anhydrous benzene.

To this solution, 340 cc. of a 0.2 N dry hydrochloric acid solution in benzene were added. On cooling this solution, an oil formed which was then isolated by decanting. This oil was washed first with benzene, then with petroleum ether and next dissolved in ethanol. The solution was neutralized with a sodium hydroxide solution, diluted with a large volume of water and finally extracted with benzene.

After washing, drying and evaporation to dryness, 6.2 gm. of product were obtained, which was dissolved in 63 cc. of ethanol and treated with a solution of 2.80 gm. of oxalic acid in 9 cc. of ethanol. The mixture was agitated for 20 minutes, then diluted with water and extracted with benzene. The aqueous phase was alkalized by adding 0.5 cc. of a potassium hydroxide solution.

The resultant precipitate was extracted with benzene. After washing, drying and evaporation to dryness, a crystallized produce was isolated, which was subjected to chromatography through alumina with elution with benzene containing 1% of acetone. On evaporation of this eluate, finally, 20-methyl-20-diethylamino-5β-pregnane-3α-ol was obtained. The product obtained was recrystallized from cyclohexane and had a melting point of 136° C. (solvated).

This compound was colorless, slightly soluble in cyclohexane, and soluble in alcohol and chloroform.

Analysis.—$C_{26}H_{47}NO$; molecular weight=389.64. Calculated: C, 80.15%; H, 12.16%; N, 3.59%. Found: C, 80.8%; H, 12.1%; N, 3.8%.

This compound is not described in the literature.

EXAMPLE 8

Preparation of 20-methyl-20-N-methyl-N-ethylamino-5β-pregnane-3α-ol

Step A: The iodoethylate of 20-methylimino-5β-pregnane-3α-ol.—3.587 gm. of 20-methylimino-5β-pregnane-3α-ol (prepared according to Example 1) were dissolved in 35 cc. of chloroform. The solution thus formed was reduced to half its volume. 35 cc. of ethyl iodide were added thereto and the reaction mixture was heated to reflux over a period of 16 hours in the absence of light.

The mixture was allowed to cool and the precipitate so formed was vacuum filtered, washed with chloroform and dried. 4.127 gm. of the iodoethylate of 20-methylimino-5β-pregnane-3α-ol were obtained, the product having a melting point of ≈300° C.

This compound was colorless, very slightly soluble in ether and chloroform, and slightly soluble in alcohol.

Analysis.—$C_{24}H_{42}ONI$; molecular weight=487.5. Calculated: N, 2.87%; I, 26.04%. Found: N, 2.8%; I, 26.8%.

This compound is not described in the literature.

The same derivative was obtained by treating, in similar fashion, 20-ethylimino-5β-pregnane-3α-ol, as obtained in the preceding example, with methyl iodide.

Step B: 20-methyl-20-N-methyl-N-ethylamino-5β-pregnane-3α-ol.—20 gm. of the iodoethylate of 20-methylimino-5β-pregnane-3α-ol were introduced into 200 cc. of anhydrous tetrahydrofuran. The suspension obtained was heated to reflux and slowly 60 cc. of a 1.7 N solution of methylmagnesium bromide in tetrahydrofuran were added thereto. The reflux was maintained for several minutes longer after the addition was finished, then the reaction mixture was poured into a saturated solution of ammonium chloride containing 5% of ammonia.

The precipitate formed was extracted with ether. The organic phases were washed with salt water, dried and evaporated to dryness. In this manner, a resin was recovered which was dissolved in ether and treated with a stream of dry gaseous hydrochloric acid.

The resultant hydrochloride was vacuum filtered, dissolved in aqueous ethanol and treated with a N sodium hydroxide solution. The liberated base was extracted with ether and the extract was evaporated to dryness. The resin thus obtained was subjected to chromatography through alumina. By means of elution with benzene, containing first 2%, then 3% of acetone and removing the solvent, 20-methyl-20-N-methyl-N-ethylamino-5β-pregnane-3α-ol was isolated.

To purify the above amine, its hydrochloride salt was again prepared as above. This salt was then dissolved in water and treated with a N sodium hydroxide solution. The free base precipitated. It was vacuum filtered, washed with water and dried. 20-methyl-20-N-methyl-N-ethylamino-5β-pregnane-3α-ol was thus obtained in form of crystals having a melting point of 140° C.

This compound was colorless, insoluble in water, and soluble in ether and chloroform.

Analysis.—$C_{25}H_{45}ON$; molecular weight=375.62. Calculated: C, 79.93%; H, 12.07%; N, 3.73%. Found: C, 80%; H, 11.8%, N, 4.0%.

This compound was not described in the literature.

As was indicated above, the products of the invention posses interesting pharmacological properties. In particular they possess a spasmolytic, vasodilatory and especially a coronarodilatory action.

They may be utilized for the treatment of spasms of coronary origin. The activity of these compounds in weak concentrations on the coronary flow of the isolated heart of the rabbit, together with their slight toxicity, permits one to recommend their usage in the treatment of angina pectoris and coronaritis. They also possess an anti-spasmodic action which permits their utilization in the treatment of asthma, bronchial spasms, arterial or visceral spasms and circulatory disorders.

The aminosteroids of Formula 1 can be administered orally, transcutaneously or rectally.

They may be prepared in the form of drinkable or injectable solutions, injectable suspensions, prepared in the form of ampoules, tablets, lozenges, syrups or suppositories.

The useful dosology varies between 2 and 20 mg. per dose and 2 to 100 mg. per day for adults as a function of the method of administration and the compound being administered.

The usual pharmaceutical forms, such as injectable solutions or suspensions, tablets, lozenges, syrups and suppositories, are prepared according to the customary processes.

EXAMPLE 9

Pharmacological Study of the compounds of the invention (I) ACTION ON THE CORONARY BLOOD FLOW The study on the action of the compounds of the invention on the coronary flow was conducted on the isolated heart of the rabbit, previously intoxicated with a barium salt, employing a technique suggested by Langendorff (Arch. Gesam. Physiol., 1895, 61, 291).

According to this method, the heart is suspended by the aorta to a canula, and the coronary system is perfused, by means of this canula, under a constant pressure of 5 cm. of mercury, with Locke serum of a pH value of 7.2 to 7.3, heated to 37° C.

The compounds under study are dissolved in ethanol, in water or in dilute hydrochloric acid, as the case might be. This solution is diluted by means of the Locke serum until a suitable concentration is obtained. A three-way cock permits the instantaneous passage from the normal Locke serum to the serum containing the product to be studied.

By means of an appropriate apparatus, the coronary blood flow and, in parallel manner, the ventriculary contractions are recorded.

The minimum concentration of said compounds, which distinctly increases the cornoray blood flow was determined and Table II below shows the results obtained with the compounds of the invention, as well as with trinitrine, papaverine, and dimethylfuntuphyllamine under identical experimental conditions.

Also in relation to these compounds, a dose greater than the active minimum dose was tested to evaluate a possible increase in the duration or in the intensity of action of the medicine.

The work on the isolated intestine of the guinea pig was performed in a vessel containing 10 cc. of Tyrode liquid, maintained at a temperature of 37° C. and under constant oxygenation. A sub-maximal contraction of the intestinal loop was effected by adding to the Tyrode liquid one of the three contracting agents at a suitable concentration.

TABLE II

| Compound Studied | Minimum active concentration in μg. per cc. in the perfusion liquid | Increase in coronary flow in percent of normal flow (Locke plus BaCl$_2$) | Duration of action in minutes | Effects on the ventricular contractions | |
|---|---|---|---|---|---|
| | | | | On amplitude | Frequency |
| Trinitrine | 1 | 57 | 13 | +15 (fugitive) | −15. |
| Papaverine | 1 | 60 | >20 | −30 | +15. |
| Dimethylfuntuphyllamine | 0.01 | 20 | 15 | Slight increase | 0. |
| 20-methyl-20-dimethylamino-5β-pregnane-3α-ol | 0.01 / 0.1 | 45 / 40–300 | 18 to 22 / 20 to 30 | 0 | 0. |
| 20-methyl-20-dimethylamino-5α-pregnane-3β-ol | 0.01 / 0.1 | 16 / 40 | 5 to 10 / 30 | 0 | 0. |
| 20-methyl-20-dimethylamino-Δ$^4$-pregnene-3-one | 0.01 / 1.0 | 27 / 80–200 | 17 | Increase | Increase. |
| 20-methyl-20-dimethylamino-5β-pregnane-3α-ol-11-one | 0.01 | 10 | 6 to 10 | 0 | 0. |
| 20-methyl-20-dimethylamino-Δ$^4$-pregnene-3,11-dione | 0.001 | 20 | 15 to 25 | 0 | 0. |
| 20-methyl-20-dimethylamino-5β-pregnane-3α,11β-diol | 0.1 to 1 | 30 | 10 to 20 | 0 | 0. |
| Dihydrochloride of 3α-dimethylaminoacetoxy-20-methyl-20-di-[amino]methyl-5β-pregnane. | 0.01 / 0.1 / 1 | 15 to 30 / 20 to 60 / About 25 | 15 to 18 / 14 to 20 / 13 | 0 / 0 / 0 | 0. / 0. / 0. |
| 20-methyl-20-diethylamino-5β-pregnane-3α-ol | 0.1 | 30 to 100 | 15 to 20 | | |
| 20-methyl-20-N-methyl-N-ethylamino-Bβ-pregnane-3α-ol | 0.01 | | | | |

(II) SPASMOLYTIC ACTIVITY: ACTION ON THE ISOLATED INTESTINE OF THE GUINEA PIG

The spasmolytic action of the aminosteroids of the invention was studied with respect to three principal contracting agents: barium chloride, acetylcholine and histamine, and compared with that of papaverine hydrochloride.

The compounds studied where then added to the bath in a constant volume whatever their concentration might be.

As it is evident from Table III, following, the aminosteroids of the invention posses a clearly antagonistic action with respect to the three contracting agents and this at concentrations, in the entirety, clearly less than those required with papaverine hydrochloride.

TABLE III.—COMPARATIVE SPASMOLYTIC PROPERTIES OF PAPAVERINE AND THE AMINOSTEROIDS OF THE INVENTION

| Compound studied | Concentrations expressed in γ/cc. in the bath of the compound studied effecting the decontraction of the contracted organ or the inhibition of the contracting agent | | | | | |
|---|---|---|---|---|---|---|
| | Intestine of the guinea pig + BaCl$_2$ | | Intestine of the guinea pig plus acetyl choline | | Intestine of the guinea pig plus histamine | |
| | Decontraction | Inhibition | Decontraction | Inhibition | Decontraction | Inhibition |
| Papaverine hydrochloride | 20 | 30 | 15 | 20 | 10–15 | 15 |
| Dimethylfuntuphyllamine | 10 | (1) | >10 | (1) | >10 | (1) |
| 20-methyl-20-dimethyl-amino-5β-pregnane-3α-ol | 2 | 2 | 2 | 2 | 2 | 2 |
| 20-methyl-20-dimethyl-amino-5α-pregnane-3β-ol | 5 | 5 | 5 | 5 | 5 | 5 |
| 20-methyl-20-dimethyl-amino-Δ$^4$-pregnene-3-one | 5 | 5 | 5 | 5 | 5 | 5 |
| 20-methyl-20-dimethyl-amino-5β-pregnane-3α-ol-11-one | 2 to 5 | 2 to 5 | 0.5 to 1 | 1 | 1 | 2–5 |
| 20-methyl-20-dimethyl-amino-Δ$^4$-pregnene-3,11-dione | 50 | 50 | 10 | 15 | 50 | 50 |
| 20-methyl-20-dimethyl-amino-5β-pregnane-3α,11β-diol | 50 | 50 | 20 | 20 | 20 | 20 |
| 3α-dimethyl-amino-acetoxy-20-methyl-20-dimethyl-amino-5β-pregnane (dihydrochloride) | 2 | 5 | 2 | 2 | 5 | 5 |
| 20-methyl-20-diethyl-amino-5β-pregnane-3α-ol | 1–2 | 1–2 | 1–2 | 1–2 | 1–2 | 1–2 |

1 No effect.

(III) EFFECT ON THE PERIPHERIC CIRCULATION

The vasodilatory action of the aminosteroids of the invention was studied on the isolated paw of the rabbit, in situ, according to a technique inspired by that described by Binet and Burstein (Presse Medicale 1949, page 445). The animal was anesthetized with urethane, and its blood was heparinated. The paw was isolated from circulation by a high ligature of the femoral artery. The blood drawn from the carotid was diffused at a constant flow, by means of a Jouvelet transfusion apparatus, into the femoral artery of the isolated paw. In addition, the diffused artery was connected to a Ludwig manometer, which allows the recording of the pressure in this artery and thus provides information regarding the vasodilation or the vasoconstriction.

The compounds under study were dissolved, as the case might be, either in physiological serum, or in 92% acetyl methylamine or in an aqueous hydrochloric acid solution, and administered intravenously.

The investigation of the peripheric vasodilatory effect was conducted in two ways:

(a) either on a basis of a constriction obtained by intravenous injection of barium chloride,
(b) or by forceful increase of the blood flow by means of the Jouvelet apparatus, which effects a pressure increase in the diffused paw. This increase became stabilized at a level which allows the evaluation of the possible vasodilatory effect of the product studied.

For 20-methyl-20-diamethylamino-5β-pregnane-3α-ol, the minimum active dose was, according to the two processes employed, 500 γ/kg. A dose of 1 mg./kg. caused a pronounced peripheric vasodilatory effect.

For the dihydrochloride of 3α-dimethylamino-acetoxy-20-methyl-20-dimethylamino-5β-pregnane,, the minimum active dose was about 200 γ/kg. by the two processes employed. This vasodilatory effect was accompanied by a fall of the arterial pressure at the level of the carotid, simultaneously recorded. In addition it was noted in the course of these recordations that each injection caused an important and durable bradycardia.

For 20-methyl-20-diethylamino-5β-pregnane-3α-ol and 20-methyl-20-N-methyl-N-ethylamino-5β-pregnane-3α-ol, the compounds were dissolved in acetyl methylamine at a concentration of 10 mg./cc. The solution was injected into the saphena vein in doses of 250 µg, 500 µg. and 1 mg./kg., after the intravenous injection of barium chloride. On the basis of constriction obtained by the intravenous injection of barium chloride, the minimum active dose of 20-methyl-20-diethylamino-5β-pregnane-3α-ol was 250 µg./kg. This dose caused a decline in the pressure in the paw of 2 cm. of mercury. At increased doses, the decline was more significant and longer lasting.

Under the same test conditions, 20-methyl-20-N-methyl-N-ethylamino-5β-pregnane-3α-ol possessed a minimum active dose of 250 µg./kg.

With regard to the other compounds, object of the invention, the peripheral effect was evaluated by utilizing only the second process (high increase of the flow by the Jouvelet apparatus).

20-methyl-20-dimethylamino-5α-pregnane-3β-ol was active starting from 500 γ/kg.

20-methyl-20-dimethylamino-Δ⁴-pregnene-3-one exercised an effect of very prolonged duration at 2 mg./kg.

20-methyl-20-dimethylamino-Δ⁴-pregnene-3,11-dione was active at 1 mg./kg. It exercised a hypotensor effect starting from 500 γ/kg.

Under the same conditions dimethylfuntuphyllamine was inactive at a dose of 500 γ/kg.

(IV) DETERMINATION OF THE TOXICITY

A—ACUTE TOXICITY (a) 20 - methyl - 20 - dimethylamino - 5β - pregnane-3α-ol.—The test for toxicity was conducted on mice of the Rockland strain, weighing between 18 and 22 gm. The substance was utilized in a suspension of 20 mg. per 1 cc. in a dispersive solution.

It was administered in this form by intraperitoneal injection to 5 groups of 5 or 10 mice, at dosages of 75, 100, 150, 200 and 300 mg./kg. respectively.

The animals were kept under observation for one week. Depending on the doses injected, the animals displayed a brief state of prostration or a convulsive state.

The average lethal dose $DL_{50}$ was about 75 mg./kg.

(b) 20 - methyl - 20 - dimethylamino - 5α - pregnane-3β-ol.—The test for toxicity was conducted under the same conditions. The compound suspended in an aqueous disperive solution with a concentration of 20 mg./cc. was administered by itneraperitoneal injection at doses of 50 mg./kg., 100 mg./kg. and 200 mg./kg.

The animals were placed under observation for one week. Following the injection, the animals displayed trembling, a state of agitation, convulsions and locomotor ataxia.

The average lethal dose $DL_{50}$ for this compound was about 100 mg./kg.

(c) 20 - methyl - 20 - dimethylamino - Δ⁴ - pregnene - 3-one.—The compound suspended in an aqueous dispersive solution was administered to groups of 5 or 10 mice by intraperitoneal injection at doses of 100, 150 and 200 mg./kg. The animals, placed under observation for one week, displayed the following symptoms: trembling, state of agitation followed by convulsions.

The average lethal dose was about 150 mg./kg.

(d) 20 - methyl - 20 - dimethylamine - 5β - pregnane-3α-ol-11-one.—This compound disolved in dilute hydrochloric acid with a concentration of 20 mg./cc. was administered by intravenous injection to groups of 10 mice at doses of 20, 30 and 50 mg./kg. respectively.

The animals were placed under observation for one week. After the injection they showed a state of agitation with some convulsions.

The average lethal dose $DL_{50}$ was about 30 mg./kg. given by intravenous injection.

(e) 20 - methyl - 20 - dimethylamino - Δ⁴ - pregnene - 3,11-dione.—This compound dissolved in dilute hydrochloric acid with a concentration of 10 mg./cc. was administered by intravenous injection to groups of 10 mice at doses of 10, 15, 20 and 25 mg./kg., respectively.

The animals, placed under observation for 7 days, displayed a convulsive state after the injection.

The average lethal dose $DL_{50}$ was 17 mg.±1/kg. administered by intravenous injection.

(f) 20 - methyl - 20 - dimethlamino - 5β - pregnane-3α,11β-diol.—The test for toxicity was conducted under the same conditions.

The average lethal dose $DL_{50}$ was 57 mg./kg.

(g) The dihydrochloride of 3α-dimethylamino-acetoxy-20-methyl-20-dimethylamino-5β-pregnane.—This compound, in solution in water at a concentration of 10 mg./cc., was administered by intravenous injection to groups of 10 mice of Rockland strain of an average weight of 20 g. at doses of 20, 30, 40 and 50 mg./kg., respectively. The animals were held under observation for a period of 7 days. At elevated doses, the animals presented the following symptoms: polypnia, convulsions, then death.

The following mortality was noted:

at the dose of 20 mg./kg.—1 death out of 10
at the dose of 30 mg./kg.—2 deaths out of 10
at the dose of 40 mg./kg.—5 deaths out of 10
at the dose of 50 mg./kg.—10 deaths out of 10.

The average lethal dose $DL_{50}$ determined graphically according to the method of Miller et al. (Proc. Biol. Exp. Med. 1944, 57, 261) was 35 mg.±4/kg. administered intravenously.

(h) 20 - methyl - 20 - N - methyl - N - ethylamino - 5β pregnane-3α-ol.—This compound suspended in an aqueous dispersive solute, was administered by intraperitoneal injection at doses of 50, 100 and 200 mg./kg., respectively.

The animals were observed for one week. The DL₅₀ was, under these test conditions, about 150 mg./kg.

The preceding examples are illustrative of the invention. It is to be understood however that other expedients may be employed without departing from the spirit of the invention and the scope of the appended claims.

We claim:
1. An amino steroid selected from the group consisting of
  (1) compounds of the formula

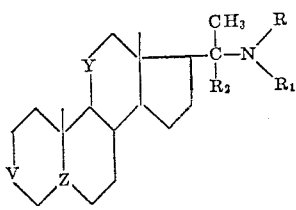

(2) compounds of the formula

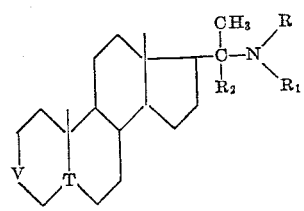

and
  (3) compounds of the formula

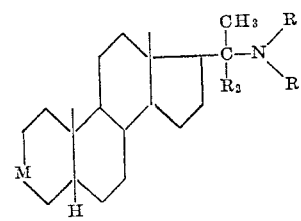

wherein R and $R_1$ are lower alkyl, $R_2$ is alkyl having from 1 to 4 carbon atoms, Y is selected from the group consisting of

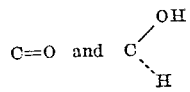

V is selected from the group consisting of

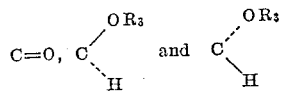

where $R_3$ is selected from the group consisting of hydrogen and the acyl of an organic carboxylic acid having from one to eighteen carbon atoms, M is selected from the group consisting of

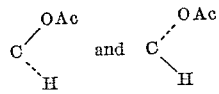

where Ac represents the acyl of an organic carboxylic acid having from one to eighteen carbon atoms, Z is selected from the group consisting of C—H, C with a double bond to the 4 carbon atom and C with a double bond to the 6 carbon atom, and T is selected from the group consisting of C with a double bond to the 4 carbon atom and C with a double bond to the 6 carbon atom, and salts of the same with pharmacologically compatible acids.

2. 20-methyl-20-dimethylamino-5β-pregnane-3α-ol.
3. 3α-dimethylaminoacetoxy - 20 - methyl - 20 - dimethylamino-5β-pregnane.
4. The dihydrochloride of 3α-dimethylamino-acetoxy-20-methyl-20-dimethylamino-5β-pregnane.

5. 20 - methyl - 20 - dimethylamino - 5β - pregnane - 3α,11β-diol.
6. 20-methyl-20 - dimethylamino - 5β - pregnane - 3α - ol-11-one.
7. 20-methyl-20-dimethylamino - Δ⁴ - pregnene - 3,11 - dione.
8. 20-methyl-20-dimethylamino-Δ⁴-pregnene-3-one.
9. 20-methyl-20-dimethylamino - 5β - pregnane - 3,11 - dione.
10. 20-methyl-20-dimethylamino-Δ⁵-pregnene-3β-ol. boxylic acid having from one to eighteen carbon atoms,
11. 20-methyl-20-N-methyl-N - ethylamino - 5β - pregnane-3α-ol.
12. A ternary iminium compound of the formula

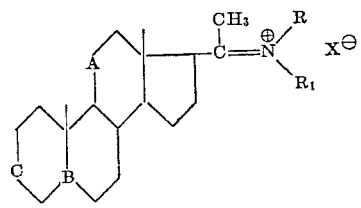

wherein A is selected from the group consisting of $CH_2$ and

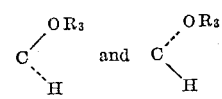

B is selected from the group consisting of C—H and C with a double bond to the 6 carbon atom, C is selected from the group consisting of

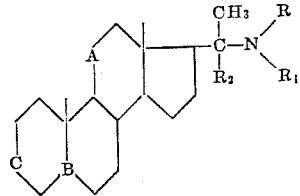

R and $R_1$ are lower alkyl, $R_3$ is selected from the group consisting of hydrogen and the acyl of an organic carboxylic acid having from one to eighteen carbon atoms, and X is a iodide.

13. The iodomethylate of 20-methylimino-5β-pregnane-3α-ol.
14. The iodoethylate of 20-methylamino-5β-pregnane-3α-ol.
15. The iodoethylate of 20-ethylimino-5β-pregnane-3α-ol.
16. The iodomethylate of 20-methylimino-5β-pregnane-3α,11β-diol.
17. The iodomethylate of 20-methylimino-Δ⁵-pregnene-3β-ol.
18. 3α - acetoxy-20-methyl-20-dimethylamino-5β-pregnane-11β-ol.
19. 3α - acetoxy-20-methyl-20-dimethylamino-5β-pregnane-11-one.
20. 4ξ-bromo - 20 - methyl-20-dimethylamino-5β-pregnane-3,11-dione.
21. Therapeutic compositions comprising 2 to 20 mg. per dose of the amino steroid of claim 1 and a major amount of a pharmacological carrier.
22. A process for the production of an amino steroid of the formula wherein A is selected from the group consisting of CH₂ and

B is selected from the group consisting of C—H and C with a double bond to the 6 carbon atom, C is selected from the group consisting of

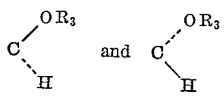

R and R₁ are lower alkyl, R₂ is alkyl having from 1 to 4 carbon atoms, and R₃ is selected from the group consisting of hydrogen and the acyl of an organic carboxylic acid having from 1 to 18 carbon atoms, which comprises (a) reacting a compound of the formula

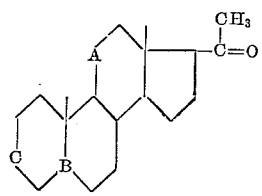

wherein A, B and C have the above-noted meanings, with a primary amine of the formula

NH₂R where R has the above-noted meaning in the presence of an inert solvent, (b) reacting an imino steroid of the formula

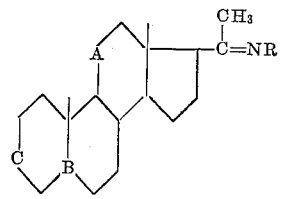

wherein A, B, C and R have the above-noted meanings, with a halide of the formula

R₁X wherein X is a iodide and R₁ has the above-noted meaning, in an inert organic solvent at refluxing temperatures, (c) reacting a ternary iminium compound of the formula

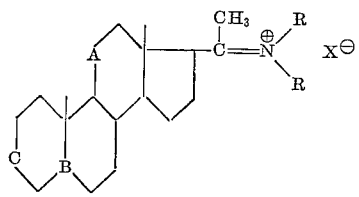

wherein A, B, C, R, R₁ and X have the above-noted meanings, with an alkyl magnesium halide of the formula R₂MgD wherein R₂ has the above-noted meanings and D represents a halide in an inert organic solvent at refluxing temperatures, and (d) recovering said amino steroid.

References Cited by the Examiner
UNITED STATES PATENTS 3,072,637 1/1963 Jeger _____ 260—239.5
3,098,082 7/1963 Mainil et al. _____ 260—397.3

LEWIS GOTTS, *Primary Examiner.*

HENRY A. FRENCH, *Assistant Examiner.*